(12) United States Patent
Stultz et al.

(10) Patent No.: US 6,246,711 B1
(45) Date of Patent: Jun. 12, 2001

(54) INTEGRATING DIODE PUMP CAVITY FOR AN ER, YB:GLASS LASER

(75) Inventors: Robert D. Stultz, Huntington Beach, CA (US); Julie L. Bentley, Webster, NY (US); David S. Sumida, Los Angeles; Hans W. Bruesselbach, Calabasas, both of CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/276,282

(22) Filed: Mar. 25, 1999

(51) Int. Cl.[7] ............................................ H01S 3/08
(52) U.S. Cl. ...................... 372/92; 372/40; 372/66; 372/72
(58) Field of Search ............... 372/22, 66, 40, 372/72, 64, 75, 98, 99

(56) References Cited

U.S. PATENT DOCUMENTS

| | | |
|---|---|---|
| 3,590,004 | 6/1971 | Woodcock . |
| 3,663,474 | 5/1972 | Lee et al. . |
| 4,962,067 | 10/1990 | Myers . |
| 5,033,058 * | 7/1991 | Cabaret et al. ............... 372/92 |
| 5,225,925 | 7/1993 | Grubb et al. . |
| 5,349,600 * | 9/1994 | Shinbori et al. ............... 372/92 |
| 5,661,738 * | 8/1997 | Yasui et al. ............... 372/72 |
| 5,761,233 * | 6/1998 | Bruesselbach et al. ............... 372/72 |
| 6,038,244 * | 3/2000 | Usui et al. ............... 372/75 |

FOREIGN PATENT DOCUMENTS

| | | |
|---|---|---|
| 0801449 | 4/1997 | (EP) . |
| 06130821 | 5/1994 | (JP) . |

OTHER PUBLICATIONS

Taccheo, P. Laporta, Longhi, S., and Svelto, O., "Diode–Pumped Microchip Er–Yb:Glass Laser", Optics Letters, Optical Society of America (1993).
Kubo, Tracy S., and Kane, Thomas J., "Diode–Pumped Lasers at Five Eye–Safe Wavelengths", IEEE Journal of Quantum Electronics No. 4, (1992).

* cited by examiner

Primary Examiner—Leon Scott, Jr.
(74) Attorney, Agent, or Firm—Colin M. Raufer; Leonard A. Alkov; Glenn H. Lenzen, Jr.

(57) ABSTRACT

A multi-pass, integrating diode pump cavity for an Er,Yb:glass laser is provided. The diode pump cavity comprises two end members of undoped glass sandwiching a center section of glass of the same composition as that of the two end members but doped with erbium and ytterbium ions. The two end members are each provided with a curved outer surface, which is coated with a reflective coating. At least one of the curved surfaces includes a slit through the reflective coating for transmission of pump laser light from a pump diode laser bar into the cavity. The diode pump cavity is small, compact, efficient, and eye-safe.

24 Claims, 3 Drawing Sheets

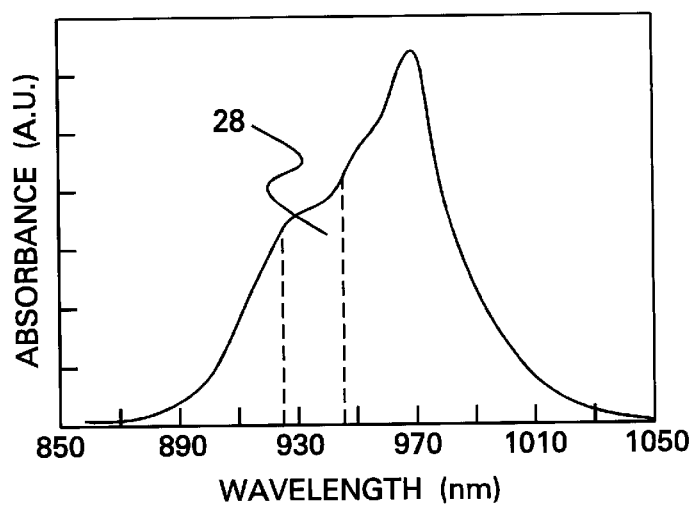
FIG. 2
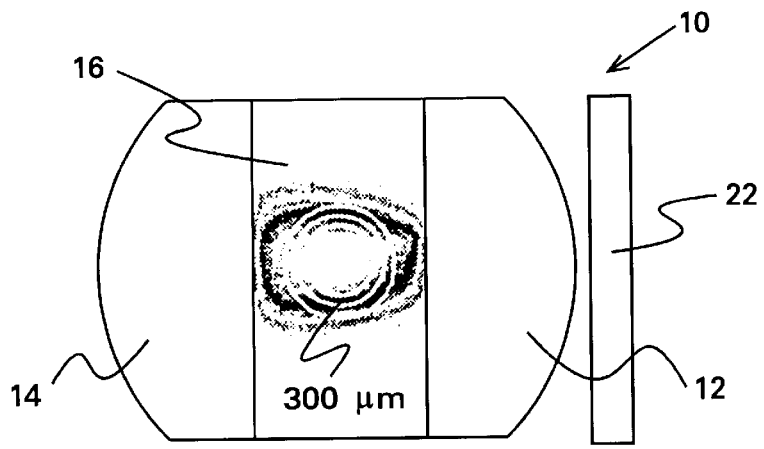
FIG. 3a
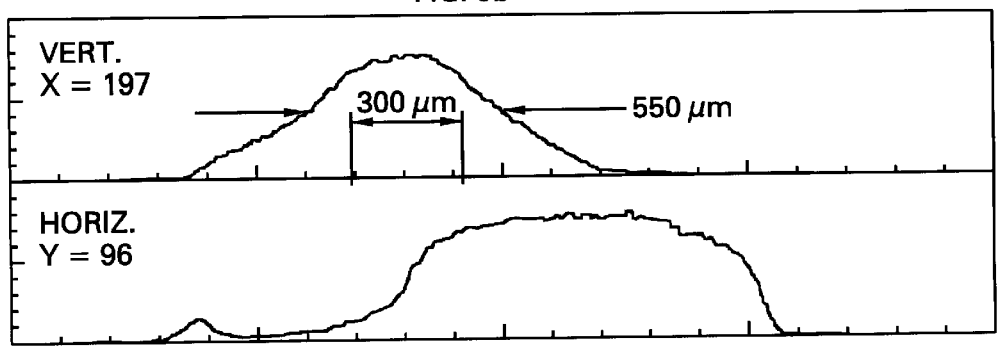
FIG. 3b
FIG. 3c

INTEGRATING DIODE PUMP CAVITY FOR AN ER, YB:GLASS LASER

TECHNICAL FIELD

The present invention relates generally to pump cavities for lasers, and, more particularly, to a diode pump cavity for a glass laser.

BACKGROUND ART

There is a need for a small, compact, efficient, eye-safe laser for a variety of applications. These include law enforcement, rifle enthusiasts, commercial mariners, sports enthusiasts, construction industry, search and rescue, fire fighting, skiers, yachting, golfers, and municipal agencies, among others. A number of solutions have been proposed.

For example, one such solution comprises a flash lamp or diode-pumped erbium glass with a mechanical Q-switch. However, this approach requires the use of several diodes and a mechanical Q-switch, resulting in a more complicated, inherently larger apparatus than desired.

Another solution employs a Nd-YAG pumped optical parametric oscillator, which relies on conversion of Nd emission to an eye-safe wavelength. The wavelength conversion results in lower efficiency and the apparatus requires active heating/cooling.

Thus, there remains a need for a small, compact, efficient, eye-safe laser.

DISCLOSURE OF INVENTION

In accordance with the present invention, an Er:Yb:glass laser rod is integrated with a diode pump laser cavity, providing a small, compact, efficient, eye-safe laser. The all-glass laser rod comprises two undoped glass sections sandwiching a center section doped with $Er^{3+}$ and $Yb^{3+}$. Lasing is achieved by pumping the center section with a pump laser.

The laser of the present invention is small, compact, efficient, eye-safe laser. The laser of the present invention is small, compact, and efficient, because only one diode is required, in contrast to the prior art approaches discussed above, and no conversion to a second wavelength is involved. Further, the laser lases at about 1.5 $\mu$m, which is considered to be eye-safe.

BRIEF DESCRIPTION OF THE DRAWINGS

FIG. 2, on coordinates of absorption (in arbitrary units) and wavelength (in nanometers), is a plot of Yb absorption near 940 nm, also showing the wavelength shift of a 940 nm diode over temperature;

FIG. 3a is a line drawing, depicting 1.5 $\mu$m erbium fluorescence, the outline of the glass cavity, and the relative size of the 300 $\mu$m laser resonator mode;

FIG. 3b, on coordinates of intensity (in arbitrary units) and distance (in $\mu$m), depicts the fluorescence intensity profile along section 3b–3b of FIG. 1a;

FIG. 3c, on coordinates of intensity (in arbitrary units) and distance (in $\mu$m), depicts the fluorescence intensity profile along section 3c–3c of FIG. 1a;

BEST MODES FOR CARRYING OUT THE INVENTION

Reference is now made in detail to a specific embodiment of the present invention, which illustrates the best mode presently contemplated by the inventors for practicing the invention. Alternative embodiments are also briefly described as applicable.

In accordance with the present invention, an Er:Yb:glass laser rod is integrated with a diode pump laser cavity, providing a small, compact, efficient, eye-safe laser.

Figure 1:
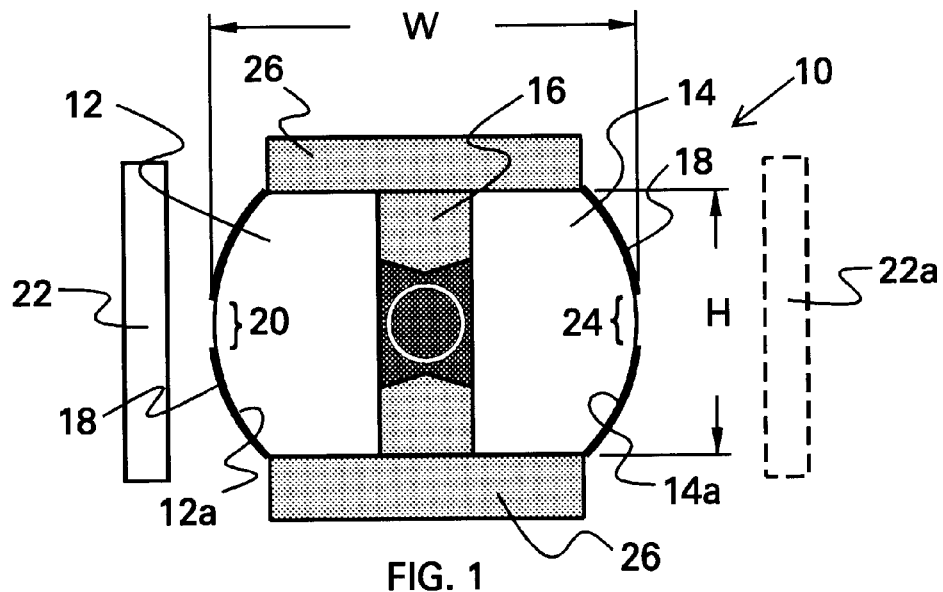
FIG. 1 is a cross-sectional view of a diffusion-bonded glass cavity useful in the practice of the present invention.
Figure 1A:
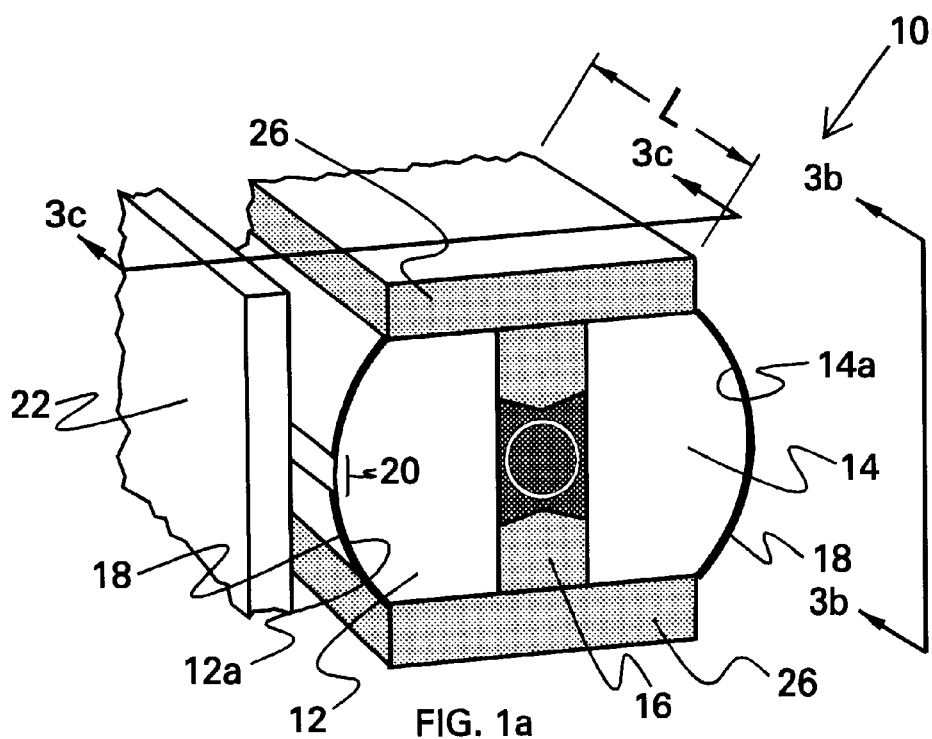
FIG. 1a is a perspective view of the glass cavity of FIG. 1.

The integrating glass cavity 10, used in the reduction to practice, is depicted in FIGS. 1 and 1a. The cavity 10 consists of two undoped phosphate glass pieces 12, 14 with curved outer surfaces 12a, 14a, respectively, and a rectangular phosphate glass center section piece 16, doped with erbium and ytterbium. Phosphate glasses doped with erbium and ytterbium are commercially available from Kigre, Inc. (Hilton Head, S.C.).

The curved outer surfaces 12a, 14a are coated with a high reflectivity film 18, except for a slit 20 on one of the surfaces, here, 12a. The reflectivity film 18 is a dielectric coating, having a broad band reflectivity of at least 98% in the range of 920 to 980 nm at an angle of 0 to 20 degrees. Such reflectivity films are well-known.

The slit 20 runs along the length of the rod 10 and is centered on the curved outer surface 12a. The slit 20 provides a means for injecting light from a diode pump 22 into the cavity 10. A second slit 24, shown in FIG. 1 but omitted from FIG. 1a, may optionally be added to the other curved surface, here, 14a, to provide for two sided pumping, using a second diode pump (shown in phantom in FIG. 1 and denoted 22a). Only one, or at most two, diode pumps 22 are required to pump the cavity 10, in contrast to prior art approaches that require considerably more such diode pumps.

The slit 20 (and 24, if employed) is coated with an anti-reflection coating. Such AR coatings are well-known.

The cavity 10 has a length L (receding into the plane of the drawing), a width W and a height H. The width W of the cavity 10 and the radius of curvature of the curved outer surfaces 12a, 14a are adjusted to provide pumping of the doped center section 16, thereby optimizing the laser.

A heat sink 26 is provided on both top and bottom of the cavity 10 for removing heat generated during laser operation. The heat sinks comprise conventional thermally conductive material, such as aluminum or copper. The heat sinks 26 are advantageously bonded to the cavity 10 with a conventional thermally-conductive adhesive. In this manner, the cavity is passively cooled, and requires no external active coolant apparatus, in contrast to prior art approaches.

In a specific example, the prototype cavity 10 was 10 mm long×1.7 mm×1.0 mm, and consisted of two undoped phosphate glass pieces 12, 14 with curved outer surfaces (radius of curvature=1.4 mm), and a rectangular 0.5 mm wide phosphate glass center section piece 16 which was doped with 0.5% $Er_2O_3$ and 13% $Yb_2O_3$. All three components 12, 14, 16 were composed of the same base QE-7 phosphate glass supplied by Kigre, Inc. (Hilton Head, S.C.). The Er-Yb-doped phosphate glass is apparently disclosed and claimed in U.S. Pat. No. 4,962,067.

The three glass components 12, 14, 16 were diffusion-bonded together by Onyx Optics (Dublin, Calif.), to form a single monolithic structure 10. Diffusion-bonding is a well-known process, and is disclosed, for example, in U.S. Pat. No. 5,441,803. The design actually called for a 0.5 mm thick doped center section, but the fabricated part did not comply with the drawing. However, even with the fabrication error, the basic principal of the invention was demonstrated in the reduction to practice.

The outer (curved) surfaces 12a, 14a of the glass cavity 10 were coated with dielectric multi-layer 18 for a broadband high reflectivity (greater than 98% reflective over the wavelength range of 920 to 980 nm at 0 to 20 degrees angle of incidence), except for a 75 µm wide slit 20 running along the length of the rod 10 and centered on one of the curved surfaces, here, 12a. This slit 20 provided a means for injecting the diode pump light from the diode laser 22 into the cavity 10, and was anti-reflection coated for the same wavelength band (920 to 980 nm). The ends of the cavity 10 were anti-reflection (AR) coated at 1533 nm (laser line of the Er,Yb:glass). The diode laser 22 used in the reduction to practice was a commercial off-the-shelf 20 Watt CW InGaAs 940 nm diode bar, with a passively-cooled heat sink package, manufactured by Opto-Power (Tucson, Ariz.).

The diode light is absorbed by Yb (in the doped center section 16) as shown in FIG. 2. The energy absorbed by Yb is transferred to Er (which is the laser active ion). Also shown is the wavelength shift of a 940 nm diode over temperature, as denoted in region 28, which evidences a wavelength shift of 0.3 nm/° C.

It will be appreciated by the person skilled in this art that the high reflectivity (HR) dielectric coating 18 on the curved surfaces 12a, 14a could be replaced with a metallic coating (e.g., silver). Also, a second slit 24 (shown in FIG. 1 but omitted from FIG. 1a) could be added to the other curved surface, here, 14a, to provide for two-sided pumping.

After entering through the AR-coated 75 µm slit 20, the diode light is reflected multiple times between the two HR-coated curved surfaces 14a, 12a until the light is completely absorbed in the center of the doped section 16 (referring to FIG. 1). A small amount of the light escapes through the entrance slit 20. The 940 nm light is only absorbed in the center section 16, not in the undoped outer sections 12, 14.

The transverse intensity profile of the 1.5 µm fluorescence, from the $^4I_{13/2} \rightarrow {}^4I_{15/2}$ transition in $Er^{3+}$, was measured and showed that the intensity was largely confined in the doped center section 16 and along the length of the cavity 10, as illustrated in FIGS. 3a–3c. FIG. 3a is a cross-sectional view, similar to that of FIG. 1, depicting by way of a line drawing the 1.5 µm $Er^{3+}$ fluorescence and the 300 µm laser mode. The plot shown in FIG. 3b is taken along section 3b–3b of FIG. 1a, and shows the vertical intensity profile in the cavity along its height. The intensity is seen to be largely confined in the doped center section 16 (which, in this case, was 0.77 µm wide). The plot shown in FIG. 3c is taken along section 3c–3c of FIG. 1a, and shows the horizontal intensity profile in the cavity along its width. The intensity is seen to be confined in the doped region of the cavity 10.

A breadboard laser was constructed using the diode (aluminum) pumphead. The diffusion-bonded glass rod was held in place using an aluminum clamp, with 0.02 inch thick layers of indium separating the flat surfaces of the glass rod and the aluminum housing. A single commercial off-the-shelf InGaAs 20W CW diode bar (940 nm) was used to pump the glass rod (one-sided pumping). The diode was actually operated at 25W peak power (higher than its CW rating). The amount of diode energy input to the rod was controlled by adjusting the length of the diode pulse-width.

The laser resonator cavity was near-hemispherical, consisting of a flat 100% reflective (at 1.53 µm) mirror, and a concave, 10 cm radius of curvature outcoupling mirror with a reflectivity of 85% at 1.53 µm. The mirrors were separated by about 10 cm. The fundamental mode ($TEM_{00}$) size in the diffusion-bonded glass rod was about 300 µm diameter ($e^{-2}$).

Figure 4A:
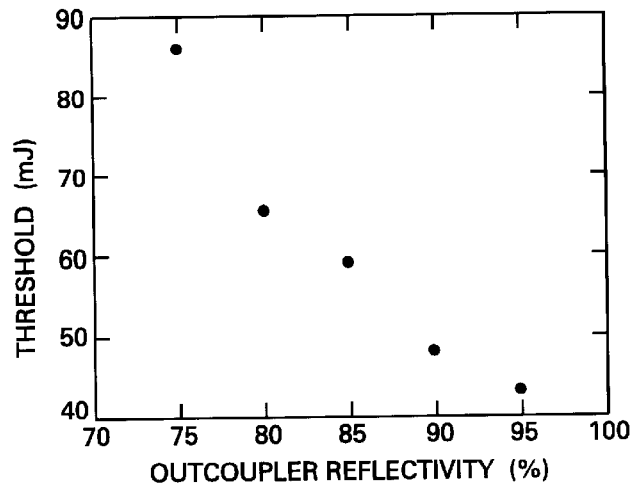
FIG. 4a, on coordinates of laser threshold (in millijoules) and outcoupler reflectivity (in percent), is a plot of threshold as a function of threshold versus resonator out-coupler reflectivity.
Figure 4B:
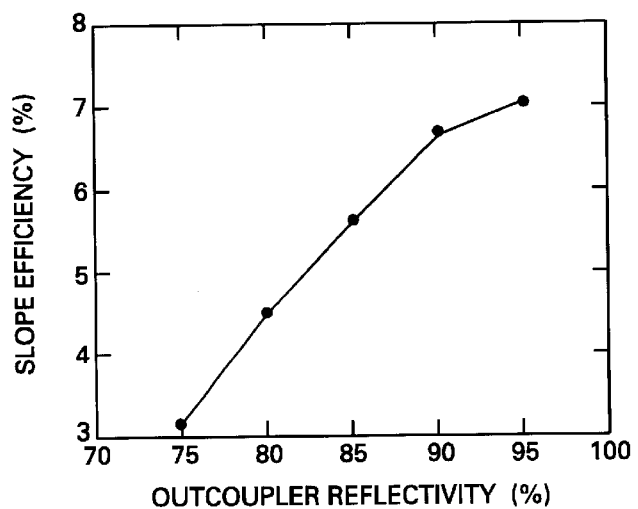
FIG. 4b, on coordinates of laser slope efficiency (in percent) and outcoupler reflectivity (in percent), is a plot of slope efficiency versus resonator outcoupler reflectivity.

The laser results from the breadboard above are summarized in FIGS. 4a and 4b. Thresholds of close to 40 mJ of diode optical input energy (FIG. 4a) and free-running 1.5 µm slope efficiencies of up to 7% (FIG. 4b) were demonstrated in the breadboard laser. Approximately 0.4 mJ of Q-switched output energy at 1.53 µm was demonstrated with the insertion (in the resonator cavity) of a $U:CaF_2$ passive Q-switch.

Figure 5:
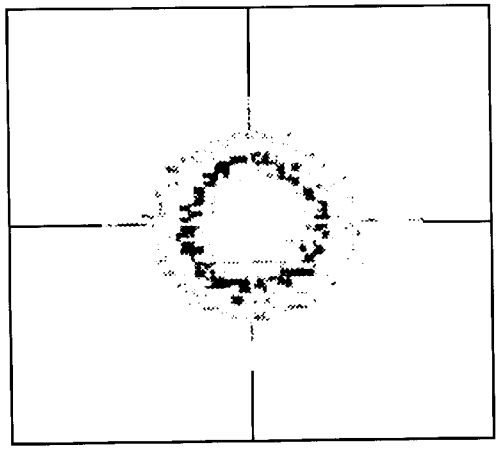
FIG. 5 is an output beam profile of a prototype transmitter in which $M^2=1.15$.

A prototype brassboard Q-switched 1.53 µm laser transmitter was constructed based on the breadboard laser configuration. The 1.53 µm output was $TEM_{00}$ ($M^2$=1.15, see FIG. 5), with an energy of 0.4 mJ and a 29 ns pulsewidth, where $M^2$ represents the relative divergence of the beam compared to a Gaussian (diffraction-limited) beam. The transmitter was operated in 10 Hz continuous repetition rate, or in a 20 Hz, 10 pulses on, 10 pulses off mode. Higher repetition rates or duty cycles were not tested. The glass cavities were 1×1.7×10 mm, and the Q-switch was 5 mm diameter.

INDUSTRIAL APPLICABILITY

The all-glass cavity disclosed herein is expected to find use in small, compact, efficient lasers.

Thus, there has been disclosed an all-glass cavity which includes an $Er^{3+}:Yb^{3+}$ doped center section for use in constructing a small, compact, efficient, eye-safe laser. It will be readily apparent to those skilled in this art that various changes and modifications of an obvious nature may be made, and all such changes and modifications are intended to be covered by the scope of the present invention, as defined by the appended claims.

What is claimed is:

1. A selectively doped diffusion bonded pump cavity for an Er,Yb:glass laser, comprising two end members of undoped glass sandwiching a center section of glass of the same composition as that of the two end members but having a predetermined doping level of erbium and ytterbium ions, said center sections of glass having an absorption wavelength of pumped light greater than said two end members of undoped glass, said two end members each provided with a curved outer surface, said curved outer surface coated with a reflective coating, at least one of said curved surfaces including a silt through said reflective coating for transmission of pump laser light into said cavity.

2. The diode pump cavity of claim 1 wherein said glass comprises a phosphate glass.

3. The diode pump cavity of claim 2 wherein said center section of glass is doped with about 0.5 wt % $Er_2O_3$ and about 13 wt % $Yb_2O_3$.

4. The diode pump cavity of claim 1 wherein said reflective coating is at least 98% reflective over a range of 920 to 980 nm at an angle of incidence ranging from 0 to 20 degrees.

5. The diode pump cavity of claim 1 wherein said slit is coated with an anti-reflection coating.

6. The diode pump cavity of claim 5 wherein said anti-reflection coating is anti-reflective over a range of 920 to 980 nm.

7. The diode pump cavity of claim 1 wherein said cavity has a width of about 1.7 mm and wherein said outer curved surfaces have a radius of curvature of about 1.4 mm.

8. A method of fabricating a selectively doped diffusion bonded pump cavity for an Er,Yb:glass laser, comprising:
   (a) providing two end members of undoped glass, said two end members each provided with a curved outer surface;
   (b) providing a center section of a glass of the same composition as that of the two end members but having a predetermined doping level of erbium and ytterbium ions;
   (c) diffusion-bonding said center section between said two end members;
   (d) coating said curved outer surfaces with a reflective coating so as to leave a slit in at least one of said curved surfaces for transmission of pump laser light into said cavity; and
   (e) absorbing a greater amount of pumped light in said center section of glass than in said two end members of undoped glass.

9. The method of claim 8 wherein said glass comprises a phosphate glass.

10. The method of claim 9 wherein said center section of glass is doped with about 0.5 wt % $Er_2O_3$ and about 13 wt % $Yb_2O_3$.

11. The method of claim 8 wherein said reflective coating is at least 98% reflective over a range of 920 to 980 nm at an angle of incidence ranging from 0 to 20 degrees.

12. The method of claim 8 wherein said slit is coated with an anti-reflection coating.

13. The method of claim 12 wherein said anti-reflection coating is anti-reflective over a range of 920 to 980 nm.

14. The method of claim 8 wherein said cavity has a width of about 1.7 mm and wherein said outer curved surfaces have a radius of curvature of about 1.4 mm.

15. In combination, a selectively doped diffusion bonded pump cavity for an Er,Yb:glass laser and one or two diode pump lasers, said diode pump cavity comprising two end members of undoped glass sandwiching a center section of glass of the same composition as that of the two end members but having a predetermined doping level of erbium and ytterbium ions, said center section of glass having an absorptions wavelength of pumped light greater than said two end members of undoped glass, said two end members each provided with a curved outer surface, said curved outer surface coated with a reflective coating, at least one of said curved surfaces including a slit through said reflective coating for transmission of pump laser light into said cavity.

16. The combination of claim 15 wherein said glass comprises a phosphate glass.

17. The combination of claim 16 wherein said center section of glass is doped with about 0.5 wt % $Er_2O_3$ and about 13 wt % $Yb_2O_3$.

18. The combination of claim 15 wherein said reflective coating is at least 98% reflective over a range of 920 to 980 nm at an angle of incidence ranging from 0 to 20 degrees.

19. The combination of claim 15 wherein said slit is coated with an anti-reflection coating.

20. The combination of claim 19 wherein said anti-reflection coating is anti-reflective over a range of 920 to 980 nm.

21. The combination of claim 15 wherein said pump diode laser comprises a 20 watt, continuous wave, InGaAs 940 nm diode bar.

22. The combination of claim 15 wherein said cavity has a width of about 1.7 mm and wherein said outer curved surfaces have a radius of curvature of about 1.4 mm.

23. The combination of claim 15 wherein said diode pump cavity has one slit on one of its curved surfaces and one said diode pump laser is operatively associated with said one slit.

24. The combination of claim 15 wherein said diode pump cavity has one slit on both of its curved surfaces and a said diode pump laser is operatively associated with each said slit.

* * * * *